United States Patent [19]

Koenuma

[11] Patent Number: 4,492,031
[45] Date of Patent: Jan. 8, 1985

[54] VERNIER DEVICE OF THE DIGITAL DISPLAY TYPE FOR A UNIVERSAL PARALLEL RULER

[75] Inventor: Masao Koenuma, Tokyo, Japan

[73] Assignee: Asahi Seimitsu Kabushiki Kaisha, Tokyo, Japan

[21] Appl. No.: 370,152

[22] Filed: Apr. 21, 1982

[30] Foreign Application Priority Data

Apr. 21, 1981 [JP] Japan .................................. 56-59973

[51] Int. Cl.³ ............................................. B43L 13/08
[52] U.S. Cl. ...................................... 33/1 PT; 33/434; 33/125 C; 33/1 N
[58] Field of Search .......... 33/1 PT, 1 L, 1 N, 125 C, 33/434, 435, 438; 250/231 R, 231 SE, 578

[56] References Cited

U.S. PATENT DOCUMENTS 2,993,200  7/1961  Wacker et al. ...................... 33/1 PT
4,151,649  5/1979  Tatsuzawa ............................. 33/1 N
4,367,589  1/1983  Mainka et al. ........................ 33/1 N

FOREIGN PATENT DOCUMENTS 779803  11/1980  U.S.S.R. ................................ 33/1 N

Primary Examiner—Harry N. Haroian
Attorney, Agent, or Firm—Birch, Stewart, Kolasch & Birch

[57] ABSTRACT

A vernier device of the digital display type for a universal parallel ruler is disclosed comprising a slit protractor having slits arranged at the same visually readable protractor and a intervals as those intervals for the protractor graduations, the slit protractor being provided on one of a stationary portion and a rotatable portion of a scale operating head. A slit vernier protractor having slits at other intervals for vernier graduations is provided, the slit vernier protractor being provided on the other of the two portions of the operating head. An encoder consisting of photoconductive elements and corresponding light-emitting elements is provided with the slit protractor graduations and the slit vernier graduations interposed therebetween wherein a fine vernier angle is digitally displayed for reading on the basis of a signal representing a coincidence between a slit vernier graduation and a corresponding slit protractor graduation.

8 Claims, 4 Drawing Figures

VERNIER DEVICE OF THE DIGITAL DISPLAY TYPE FOR A UNIVERSAL PARALLEL RULER

BACKGROUND OF THE INVENTION

The present invention relates to a vernier device of the digital display type for a universal parallel ruler.

With universal parallel rulers of the prior art, it has been relatively easy to read and set the scale's rotation angle so far as the fine graduations on the protractor are concerned but similar such reading and setting have been very difficult with respect to the vernier graduations which are much finer than the fine graduations on the protractor. Although it has been proposed to display rotation angles in the digital manner, such reading and setting have proved incon- veniently troublesome since the number of positions to be displayed are so many.

SUMMARY OF THE INVENTION

It is, therefore, an object of the present inven- tion to provide a universal parallel ruler with a vernier device of the digital display type which will overcome the prior art disadvantages.

A further object of the present invention is to provide a vernier device of digital display type for a universal parallel ruler in which the scale's rotation angles relying on the vernier graduations are digitally read and displayed by an encoder.

The foregoing objects, and others, are accomplished in accordance with the present invention, by a vernier device of the digital display type for a universal parallel ruler which comprises a slit protractor having slits arranged at the same intervals as those for protractor graduations. The slit protractor is provided on one of a stationary portion and a rotatable portion of a scale operating head. A slit vernier protractor having slits at other intervals for vernier graduations is provided on the other of the portions of the scale operating head not supportive of the slit protractor. An encoder consisting of photoconductive elements and corresponding light-emitting elements is provided on opposite sides of the slit protractor graduations and the opposed slit vernier graduations such that a vernier angle of the scale is digitally displayed for reading on the basis of a signal representing a coincidence between a slit vernier graduation and a corresponding slit protractor graduation.

BRIEF DESCRIPTION OF THE DRAWINGS

The present invention will be understood from the accompanying drawings wherein.

DETAILED DESCRIPTION

Figure 1:
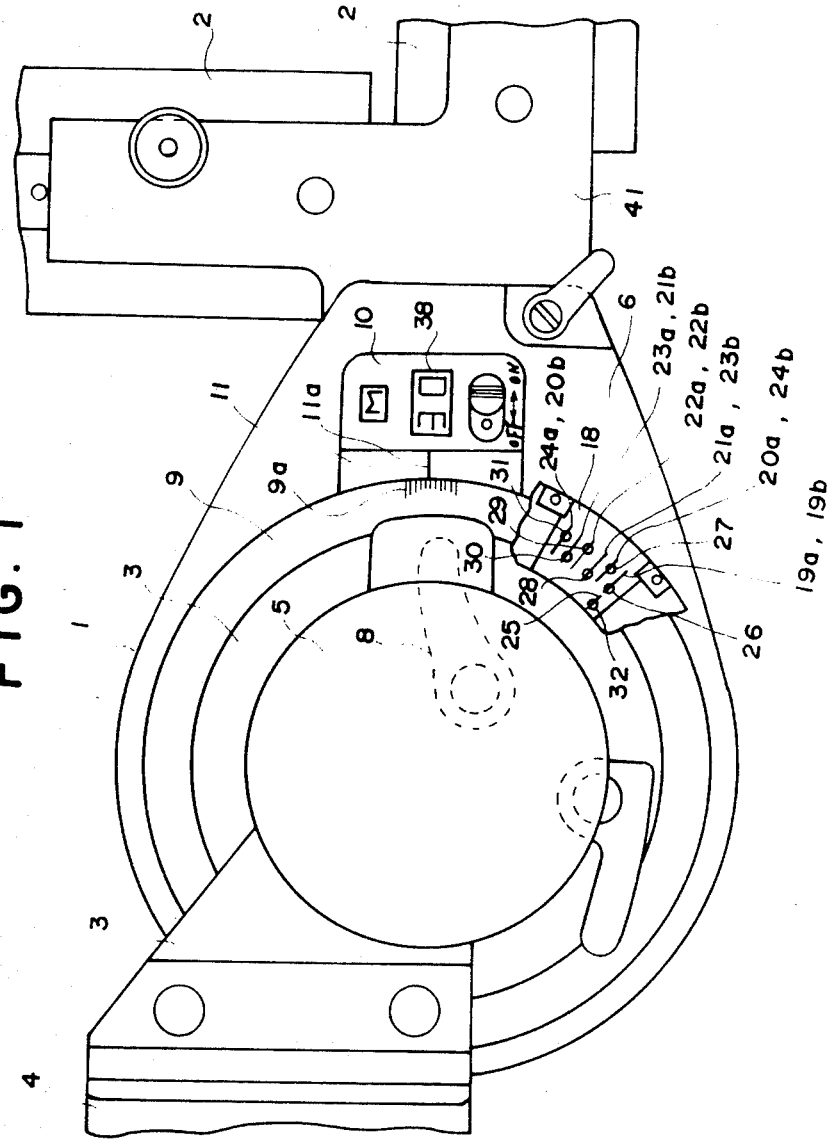
FIG. 1 is a schematic plan view partially broken away of a universal ruler showing an embodiment of the present invention.
Figure 2:
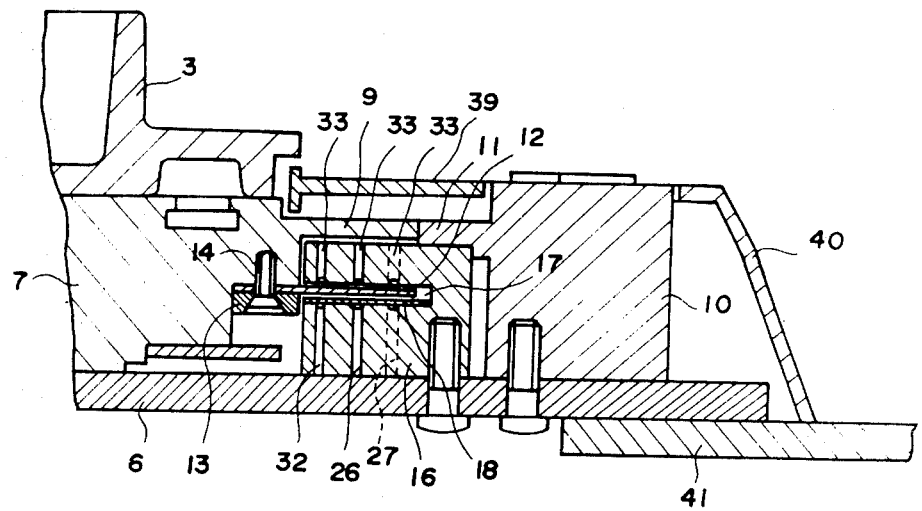
FIG. 2 is a side view showing, in a vertical section, the embodiment of FIG. 1.

Referring now to FIGS. 1 and 2, reference numeral 1 designates a head body of a universal parallel ruler. In the cases of both the track type and the arm type, this head body 1 functions to guide a scale 2 on the drawing board for parallel movement. Reference numeral 3 designates a head support which is stationary relative to rotation of the scale 2. In the case of the track type, the head support 3 is connected by a hinge mechanism 4 to a body which is movable along a guide rail. The head support 3 is centrally provided with a bearing in the form of a hollow cylinder, within which a head shaft is rotatably supported to connect an operating head 5 integrally with a scale holder 6 of the head body 1. An angle adjusting member 7 is rotatably mounted on the outer periphery of the bearing. The angle adjusting member 7 can be fixed by a protractor lever 8 to the head support 3 when the angle adjustingmember 7 occupies a predetermined angular position. A protractor 9 is formed integrally on the outer periphery of the angle adjusting member 7 and, in the case of the embodiment illustrated, the protractor 9 carries thereon outwardly visible protractor graduations 9a comprising two ranges of 180° extending clockwise and counterclockwise, respectively from 0° at intervals of 1°. A vernier display table 10 is integrally mounted on the scale holder 6 and includes an index table 11 which carries thereon an index line 11a adapted to cooperate with said protractor graduations 9a.

Figure 3:
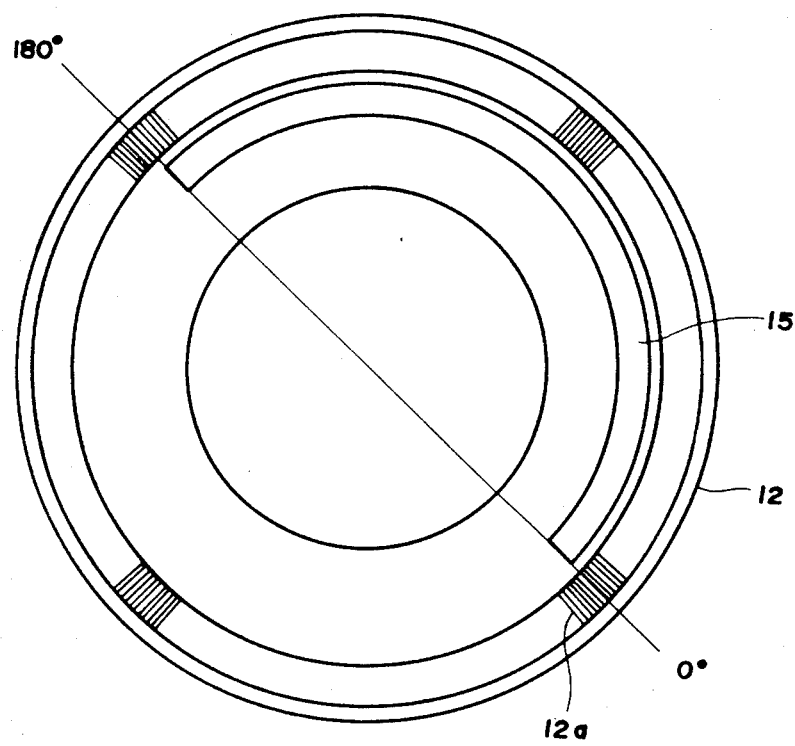
FIG. 3 is a plan view showing a slit protractor constituting an essential part of the universal ruler of the present invention.

A slit protractor 12 carrying thereon slit protractor graduations 12a extending over 360° at intervals of 1° in the same manner as said protractor graduations 9a is integrally mounted by a set screw 14 on the angle adjusting member 7 with the interposition of a holder plate. The slit protractor 12, in the embodiment shown, has a configuration of a hollow disc as shown in FIG. 3 and there is provided a cutaway sector 15 extending inside and along slit protractor graduations 12a from 0° to 180° thereof so that a direction in which the scale is rotated with respect to 0° may be determined according to the presence or absence of the cutaway sector 15. It should be understood that this cutaway sector 15 may be provided outside the slit protractor graduations 12a. In the present embodiment, the position 0° of the slit protractor graduations 12a on the angle adjusting member 7 is staggered by 45° relative to the position 0° on the protractor graduations 9a thereby allowing for mounting of an encoder station as will be described later, in an angularly offset position. The scale holder 6 has, as an integral part, a mounting member 16 for the encoder station, which is, in turn, provided with a guide groove 17 through which said slit protractor 12 extends. The guide groove 17 is provided on its lower wall with a slit vernier protractor 18 as a part of said lower wall. The slit vernier protractor 18 carriers thereon, opposite to the slit protractor graduations tions 12a provided at intervals of 1° on the slit protractor 12, slit vernier graduations 19a to 24a and 19b to 24b arranged in accordance with so-called vernier principle. More specifically, to obtain 10' interval reading, for example, there are successively provided counterclockwise (in the plus "+" rotary direction a 0' reading slit 19a, a 10' reading slit 20a, a 20' reading slit 21a, a 30' reading slit 22a, a 40' reading slit 23a and a 50' reading slit 24a, and clockwise (in the minus "−" rotary direction) a 0' reading slit 19b, a 10' reading slit 20b, a 20' reading slit 21b, a 30' reading slit 22b, a 40' reading slit 23b and a 50' reading slit 24b. In the embodiment of the present invention, the respective pairs of slit vernier graduations for 0'±30', +10' and −50', +20' and −40', +40' and −20', +50' and −10' are commonly used. On extension of the 0' reading slits 19a, 19b, there is provided a polarity discrimination slit 25 opposite to the cutaway sector 15 of said slit protractor 12. The mounting member 16 for the encoder station is provided, in association with the respective slit vernier graduations and the polarity discrimination slit, with photoconductive elements 26, 27, 28, 29, 30, 31 and 32 above which there are provided light-emitting elements 33 with the slit protractor 12 interposed therebetween. Accordingly, when the slit vernier graduations are arranged at actual intervals of 2°5', for example, the 10' reading slit 20a is spaced by 2°50', the 20' reading slit 21a is spaced by 5°40, the 30' reading slit 22a is spaced by 8°30', the 40' reading slit 23a is spaced by 11°20' and the 50' reading slit 24a is spaced by 14°10' from the 0' reading slit 19a, respectively. As a result, upon relative rotation of the slit vernier graduations and the split protractor by 10', for example, the 10' reading slit 20a comes in coincidence with the 3° graduation of the slit protractor 12 and upon relative rotation of said slit vernier graduations and the slit protractor by 30', for example, the 30' reading slit 22a comes in coincidence with the 9° graduation of the slit protractor 12. Only the slit vernier graduation in coincidence with a corresponding slit protractor graduation allows the corresponding photoconductive element to be exposed to the light coming from the corresponding light-emitting element so that a photoelectric current is generated in this photoconductive element, but the rest of the photoconductive elements are not exposed to light and, therefore, only darkness and no current is present in these remaining photoconductive elements.

Figure 4:
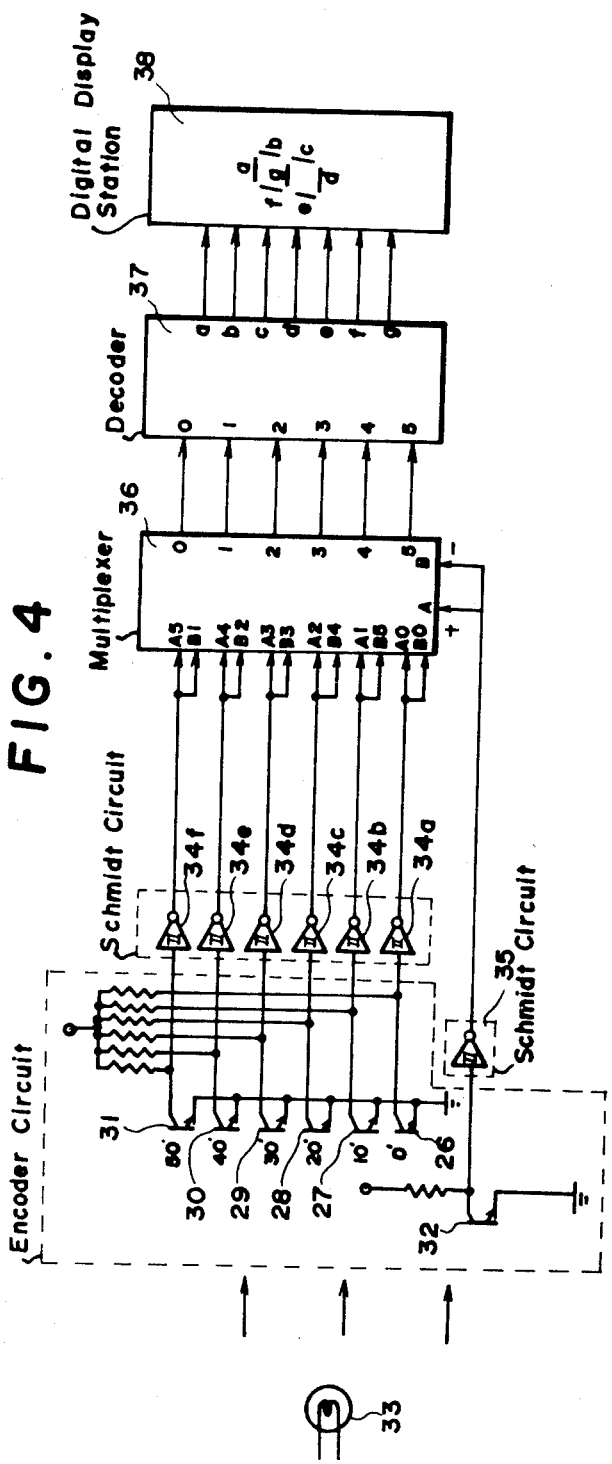
FIG. 4 is an electric circuit diagram illustrating the present invention.

Referring to the electric circuit diagram of FIG. 4, when the 30' reading slit 22a of the slit vernier graduations comes in coincidence with the corresponding slit protractor graduation, for example, a photoelectric current is generated in the photoconductive element 29 corresponding to said slit 22a and provides an encoder output of 0 level and the corresponding Schmidt circuit output of 1 level. The rest of the photoconductive elements 26, 27, 28, 30 and 31 are not exposed to light and no current flows through them so that their encoder outputs are maintained at the 1 level and the corresponding Schmidt circuit outputs are of 0 level. Assuming, that the polarity discrimination slit 25 is opposed to the cutaway sector 15 of the slit protractor 12, the photoconductive element 32 is exposed to the light and the photoelectric current generated therein provides its encoder output of 0 level and the corresponding Schmidt circuit output of 1 level, so that it is possible to determine whether a read angle is of plus or minus direction with respect to 0° as the original point (the read angle is of a plus direction on this assumption) while, if the polarity discrimination slit 25 is not opposed to the cutaway sector 15, the read angle is determined to be in a minus direction. Accordingly, the arrangement is given such that, after it has been determined by a multiplexer 36 whether a read angle is of plus direction A or minus direction B, reading is done in order of 0', 10', 20', ... 50' as shown by $A_0$ to $A_5$ for the plus direction A while in order to 0', 50', 40', ... 10' as shown by $B_0$ to $B_5$ for the minus direction B. In the previous example, the output of 1 level provided from the Schmidt circuit 34d is supplied to an input $A_3$ of the multiplexer 36, and then digitalized by a decoder 37 as 30 which is then displayed in a digital display station 38 and thus a vernier angle of 30' is displayed. As shown in FIG. 1, the digital display station 38 is provided on the vernier display table 10. Referring to FIG. 2, reference numeral 39 designates a transparent window, reference numeral 40 a cover and reference numeral 41 a scale mounting plate.

With the vernier device of digital display type according to the present invention arranged as has been described hereinabove, when the plus 10' slit 20a (the minus 50' slit 24b) of the slit vernier graduations registers with one of the slit protractor graduations 12a, the encoder output of the photoelectric current generated in the photoconductive element 27 takes 0 level and only the output of the corresponding Schmidt circuit 34b takes 1 level so that, when the output of the Schmidt circuit 35 derived from the photoelectric current generated in the photoconductive element 32 associated with the polarity discrimination slit 25 indicates the plus direction, $A_1$ is selected by the multiplexer 36 and thereby 10' is displayed. Similarly, when the minus direction is indicated, $B_5$ is selected and thereby 50' is displayed. Thus, in rotary operation of the scale, after visual reading or setting is done by the protractor graduations 9a and the index line 11a, as has conventionally been the finer case, the vernier angle may be read or set by the digital display station 38 for effective achievement of the object of the invention.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. Angular position indicating means for a universal parallel ruler, said ruler comprising support means having a stationary portion and a rotatable portion rotatable with respect to said stationary portion, said indicating means comprising;
   a first protractor comprising a plurality of visually perceptible graduations on one of said stationary and rotatable portions and a cooperating index on the other of said stationary and rotatable portions, wherein said visually perceptible graduations are spaced at first angular intervals for indicating a first angular measurement;
   a second protractor mounted on one of said stationary and rotatable portions and comprising a plurality of first apertures spaced at said first angular intervals, said second protractor also comprising a cutaway sector coextensive with said first apertures for an angle of 180° for detecting the direction in which said rotatable portion is rotated with respect to said stationary portion;
   a vernier protractor mounted on the other of said stationary and rotatable portions in juxtaposition to said second protractor, said vernier protractor comprising a plurality of second apertures spaced at second angular intervals, and also comprising discrimination means cooperating with said cutaway sector for detecting said direction in which said rotatable portion is rotated with respect to said stationary portion;
   detecting means for detecting coincidence of one of said first apertures with one of said second aperatures; and
   digital display means responsive to said detecting means for displaying a second angular measurement smaller than said first angular measurement.
2. The angular position indicating means of claim 1, wherein said first protractor comprises a first number of visually perceptible graduations, said second protractor comprises an equal number of first apertures, and said vernier protractor comprises a second smaller number of said second apertures.

3. The angular position indicating means of claim 1, wherein said first and second protractors are circular and said vernier protractor is semi-circular.

4. The angular position indicating means of claim 2, wherein said first and second protractors are circular and said vernier protractor is semi-circular.

5. The angular position indicating means of claim 1, wherein said second angular interval is greater than said first angular interval, and said second angular measurement is in units smaller than said first angular interval.

6. The angular position indicating means of claim 1, wherein said detecting means comprises a plurality of light emitting elements and a corresponding plurality of light sensitive elements positioned on opposite sides of said juxtaposed second protractor and vernier protractor.

7. The angular position indicating means of claim 1, wherein said second apertures measure increments of 10' of rotation, said second apertures being spaced from each other at intervals of 2°50'.

8. The angular position indicating means of claim 5, wherein said second angular interval is 2°50' and said second angular measurement is in units of 10'.

* * * * *